(12) United States Patent
Al-hemyari

(10) Patent No.: US 6,510,259 B1
(45) Date of Patent: Jan. 21, 2003

(54) OPTICAL SWITCH USING AN INTEGRATED MACH-ZEHNDER INTERFEROMETER HAVING A MOVABLE PHASE SHIFTER AND ASYMMETRIC ARMS

(75) Inventor: Kadhair Al-hemyari, Northville, MI (US)

(73) Assignee: LNL Technologies, Inc., Cambridge, MA (US)

(*) Notice: Subject to any disclaimer, the term of this patent is extended or adjusted under 35 U.S.C. 154(b) by 145 days.

(21) Appl. No.: 09/721,076

(22) Filed: Nov. 22, 2000

Related U.S. Application Data

(60) Provisional application No. 60/167,129, filed on Nov. 23, 1999.

(51) Int. Cl.[7] .................................................. G02B 6/10
(52) U.S. Cl. .............................. 385/16; 385/3; 356/447
(58) Field of Search ........................... 356/447; 385/12, 385/16, 3

(56) References Cited

U.S. PATENT DOCUMENTS

| 5,031,235 A | * | 7/1991 | Raskin et al. ................ 359/125 |
| 5,268,738 A | * | 12/1993 | Baney et al. .......... 250/227.19 |
| 6,341,184 B1 | * | 1/2002 | Ho et al. ........................ 385/1 |

* cited by examiner

*Primary Examiner*—Hung N. Ngo
(74) *Attorney, Agent, or Firm*—Edwards & Angell, LLP

(57) ABSTRACT

A Mach-Zehnder interferometer includes a continuous arm defining a first optical path having a length and a non-continuous arm having first and second parts with a trench defined therebetween, the non-continuous arm defining a second optical path the length of which differs from that of the first optical path. A phase shifter is selectively movable between a first position in which the phase shifter introduces no phase shift to a signal traveling along the second optical path and at least a second position at which the phase shift introduces a phase shift to the optical signal traveling along the second path relative to a signal traveling through the first optical path. A M×M optical switch using such a Mach-Zehnder interferometer.

35 Claims, 9 Drawing Sheets

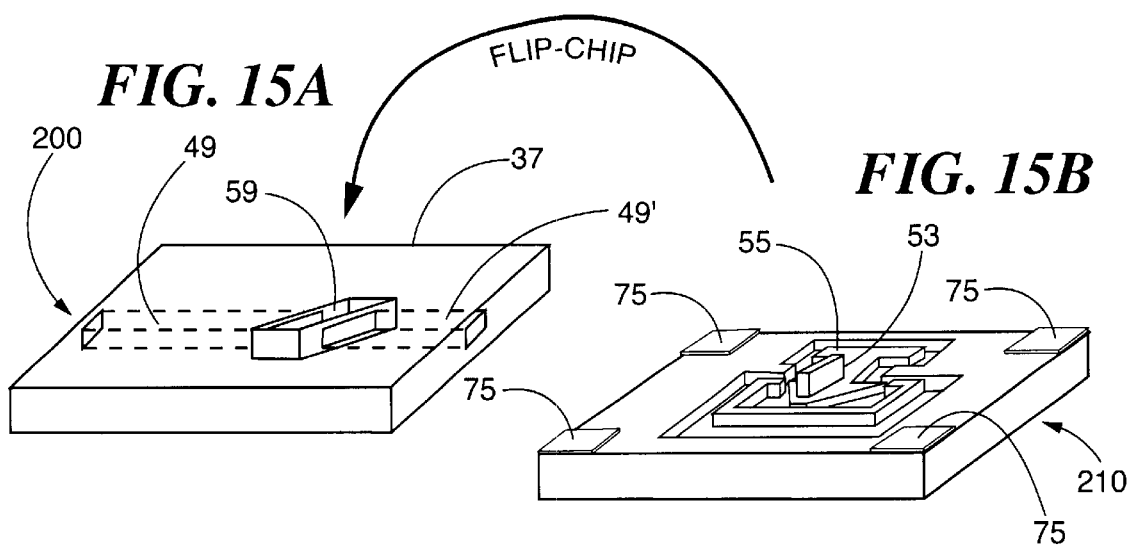
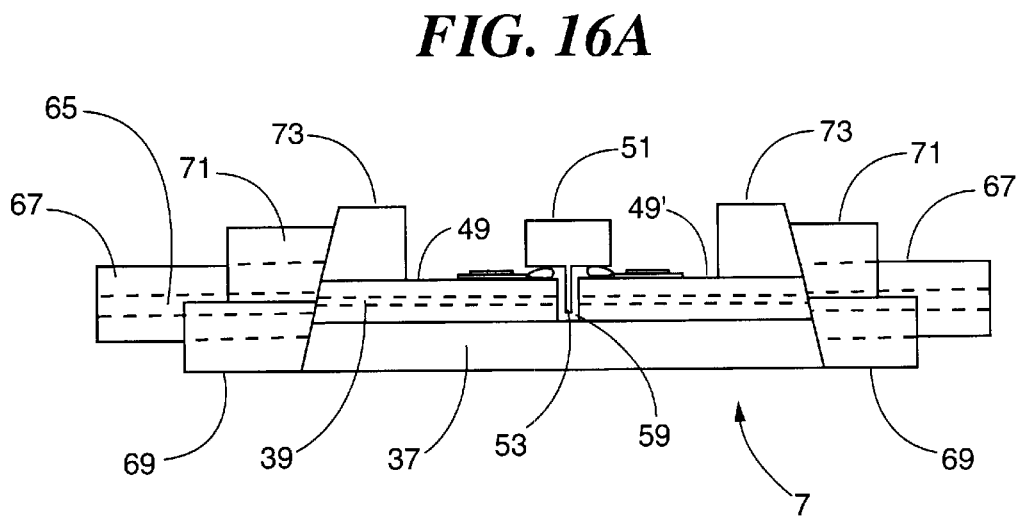
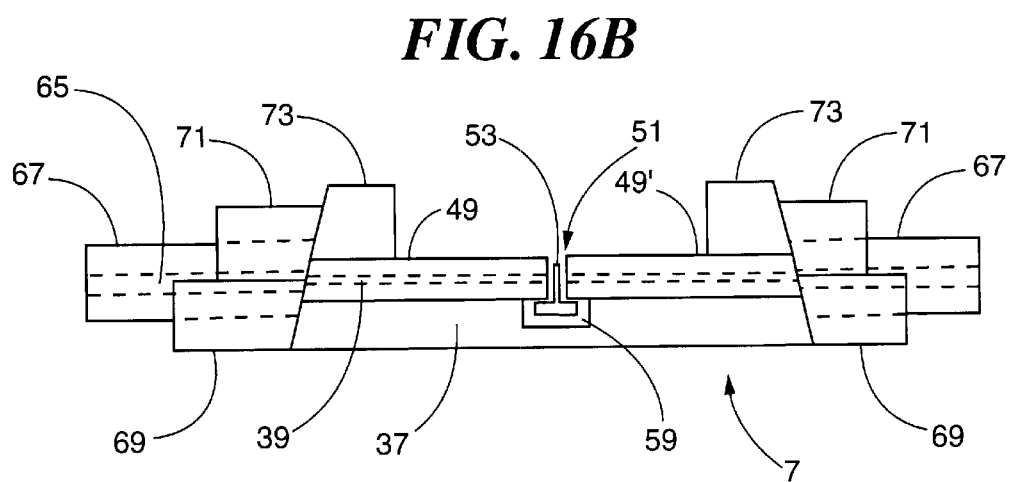

OPTICAL SWITCH USING AN INTEGRATED MACH-ZEHNDER INTERFEROMETER HAVING A MOVABLE PHASE SHIFTER AND ASYMMETRIC ARMS

CROSS-REFERENCE TO RELATED APPLICATION

This application claims priority to Provisional Patent Application No. 60/167,129, filed on Nov. 23, 1999.

FIELD OF THE INVENTION

The present invention is directed to small-scale Mach-Zehnder interferometer ("MZI") devices and structures having different length arms. The present invention is also directed to both analog and digital optical switches using such asymmetric MZI devices.

BACKGROUND OF THE INVENTION

An optical network, in its simplest representation, consists of an optical source, a destination, and a matrix of devices (e.g., fiber-optical cables, waveguides, cross-connects, amplifiers, etc.) for causing an optical signal generated by the source to reach a desired destination. Physical and geographic boundaries present no impediment to telecommunication, data communication and computing, all of which may utilize all or part of an optical network. Consequently, the number or sources and destinations, and the combinations of sources and destinations and the communication paths therebetween, may be nearly infinite. Optical switches are used in the optical network for facilitating the routing of an optical signal to its desired destination.

By way of example, FIG. 1 depicts a block diagram of a part of an optical component 1 comprising a plurality of optically interconnected optical devices 3 (e.g., switches, filters, etc.), shown in FIG. 1 as switches. As used herein, the terms "optical component" and "component" refer to any and all of a plurality of interconnected devices which may operate using any combination of optical, opto-electrical, and/or electrical technologies and which may be constructed as an integrated circuit. Devices 3 can be optically interconnected by waveguides 5. Various other optical, opto-electrical, and/or electrical devices may also be included in the optical component, as a matter of design choice. As used herein, the terms "optical", "opto-electrical", and "electrical" devices may include, by way of non-limiting example, lasers, waveguides, couplers, switches, filters, resonators, interferometers, amplifiers, modulators, multiplexers, cross-connects, routers, phase shifters, splitters, fiber-optic cables, and various other optical, opto-electrical, and electrical devices. The optical component 1 and devices 3 depicted in FIG. 1 are merely illustrative.

Although a single wavelength of light can be transmitted through the network, in order to increase the network's data-carrying capacity it is preferable to transmit multiple wavelengths of light at the same time. This is currently accomplished using techniques known as wave-division-multiplexing ("WDM"), dense WDM ("DWDM"), and ultra-dense wave-division-multiplexing ("UDWDM").

The ability to separate one optical signal from a plurality of optical signals (or one wavelength from a plurality of wavelengths in an optical signal) propagating within an optical network becomes more important as the number of signals transmitted through a single optical fiber (or waveguide) increases. As optical transmission evolves from WDM to DWDM to UDWDM, and beyond, more and more data contained in a multi-wavelength optical signal is transmitted over the optical network. Optical filters are one component that may be used to extract a desired signal (i.e., a desired wavelength) at a particular point or location in the network and route that signal to its desired destination, while also permitting other signals to continue along the network.

Optical networks transmit data as pulses of light through waveguides in a manner similar to electrical networks, which send pulses of electricity through wiring. Transmitting an optical signal between waveguides, which may occur in various devices employed in an optical network, may require the optical signal to leave one waveguide and propagate through one or more materials (mediums) before entering another waveguide. It is likely that at least one of the devices will have an index of refraction different than the index of refraction of the waveguides (which typically have approximately the same refractive index). It is known that the transmission characteristics of an optical signal may change if that signal passes through materials (mediums) having different indices of refraction. For example, a phase shift may be introduced into an optical signal passing from a material having a first index of refraction to a material having a second index of refraction due to the difference in velocity of the signal as it propagates through the respective materials and due, at least in part, to the materials' respective refractive indices. As used herein, the term "medium" is intended to be broadly construed and to include a vacuum.

If two materials (or mediums) have approximately the same index of refraction, there is no significant change in the transmission characteristics of an optical signal as it passes from one material to the other. Accordingly, one solution to the mismatch of refractive indices in an optical switch involves providing an index matching or collimation fluid to offset any difference in refractive indices. Consequently, the optical signal does not experience any significant change in the index of refraction as it passes from one waveguide to another.

An example of this approach may be found in international patent application number WO 00/25160. That application describes a switch that uses a collimation matching fluid in the chamber between the light paths (i.e., between waveguides) to maintain the switch's optical performance. The use of an index matching fluid introduces a new set of design considerations, including the possibility of leakage and a possible decrease in switch response time due to the slower movement of the switching element in a fluid.

In addition, the optical signal will experience insertion loss as it passes between waveguides. A still further concern is optical return loss caused by the discontinuity at the waveguide input/output facets and the trench. In general, as an optical signal passes through the trench, propagating along a propagation direction, it will encounter an input facet of a waveguide which, due to physical characteristics of that facet (e.g., reflectivity, verticality, waveguide material, etc.) may cause a reflection of part (in terms of optical power) of the optical signal to be directed back across the trench (i.e., in a direction opposite of the propagation direction). This is clearly undesirable because the reflected signal will interfere with the optical signal propagating along the propagation direction.

Reflection of the optical signal back across the trench also can create problems if the facets not only are coaxial, but also are parallel to one another. That arrangement forms a Fabry-Perot resonator cavity, which, under the appropriate circumstances, allows for resonance of the reflected signal, in known fashion.

Size is also an ever-present concern in the design, fabrication, and construction of optical components (i.e., devices, circuits, and systems) for use in optical networks. It is strongly desirable to provide smaller optical components so that optical devices, circuits, and systems may be fabricated more densely, consume less power, and operate more efficiently.

Currently, optical switches can be constructed using a directional coupler or a Mach-Zehnder interferometer ("MZI"), as is generally known in the art. Mach-Zehnder interferometers are known devices which take an input optical signal, split the signal in half (generally, in terms of optical power), direct the split signals along different optical paths, apply a phase shift to one of those split signals, recombine the signals and then feed those combined signals as a single signal to an output. The amount by which the phase of one of the signals is changed will, in known fashion, affect the nature of the output signal.

Conventional Mach-Zehnder interferometers shift the phase of light traveling along one of the interferometers in one of several ways. In one such way, one of the two interferometer arms is longer than the other, and this results in an inherent relative phase shift between the two signals propagating through the interferometer arms; the light traveling through the longer arm has its phase shifted relative to the light passing through the other arm. This can be considered a biasing phase shift.

The inherent relative phase shift may be "tuned" using either the electro-optic or electro-thermal technique to apply a further phase shift to the optical signal traveling through the associated arm. In this case, the overall phase shift applied to the optical signal traveling through the associated arm is the sum of the biasing phase shift and the applied phase shift. If the electro-optic effect alone is used, one of the interferometer arms is made from a medium having an index of refraction which changes in the presence of an applied electrical field. Similarly, if the electro-thermal effect is used, the interferometer has an arm made from a medium having an index of refraction that changes as the temperature of the material changes. In each of these devices, changing the index of refraction of one of the interferometer arms is comparable to changing that arm's optical length, and results in a relative phase shift between the two split signals.

In the electro-optic and electro-thermal type devices, the conditions for effecting optical switching in a device using a MZI, which operates by introducing a phase shift of up to π (i.e., 180°) into at least a part of the optical signal, are defined by the equation:

$$\Delta\phi = \pi = \frac{2\pi}{\lambda}\Delta nL \qquad (1)$$

where $\Delta\phi$ is the maximum possible phase shift of $\pi\lambda$ is the wavelength of the optical signal propagating in the device, L is the actual length of the device, and $\Delta n$ is the change in refractive index effected by the application of a carrier signal, electrical field, or change in temperature to the device. Since the change in refractive index typically achievable for current optical devices is on the order of approximately $10^{-3}$, the actual length of the device needed to introduce a maximum phase shift of π must be at least 1 mm, and preferably longer. However, to achieve large-scale density integration, the actual length L must be reduced without sacrificing the ability to effect a π phase shift in an optical signal. Those two requirements are mutually exclusive.

If the phase is to be applied using a MZI device having different length arms, the light traveling through the longer arm has its phase shifted relative to the light passing through the other arm. This technique cannot, however, be used to make compact optical switches.

There exists a genuine need in the art for compact optical switches that can effect a 0-π phase shift and which overcome the above-described shortcomings of the prior art. Preferably, such switches would combine small size and high actuation speed with low power consumption.

SUMMARY OF THE INVENTION

The present invention is directed to an analog optical switch having a MZI with a moveable phase shifter in one interferometer arm suitable for use in an optical network.

More particularly, this invention is directed to improved analog M×M switches which employ asymmetric Mach-Zehnder interferometers to control optical signals. As already explained, asymmetric MZI devices operate by dividing an input optical signal into two signals, applying a biasing phase shift and possibly a variable phase shift to just one of those signals, and then recombining the two signals. The output will depend upon the magnitude of the total phase shift applied, which will in part be a function of the MZI arm asymmetry. As noted previously, known switches of this type are larger than desired because the asymmetric MZI devices used therein operate using techniques which thwart miniaturization.

Switches according to the present invention differ from known 1×1 and 2×2 optical switches because of the unique asymmetric MZI provided in accordance with the present invention. An asymmetric MZI constructed in accordance with embodiments of the present invention includes a phase shifter in one of the two asymmetric arms of the interferometer. The phase shifter is selectively moveable into and out of an optical path defined by and through the interferometer arm so as to introduce a phase shift into an optical signal propagating in and through that interferometer arm. The phase shift applied by the phase shifter can be either a variable phase shift of 0–180° (π) or a fixed phase shift of between 0–180° (π). This arrangement dramatically reduces the size of the MZI as compared with conventional optical switches, which may employ the electro-optic, electro-thermal or asymmetric arms to introduce a phase change in an optical signal. An asymmetric MZI using a phase shifter in accordance with this invention is more compact than an asymmetric MZI which uses known techniques.

The present invention is particularly applicable to optical switches that are formed on integral planar optical substrates. Generally speaking, an integrated planar optical substrate refers to a relatively flat member having a supporting substrate and a number of layers of different materials formed thereon. The substrate and the different materials have particular optical qualities so that optically useful structures such as waveguides can be formed on the supporting substrate by suitable shaping or other processing. Such optical switches may be more compact and more rapidly actuated than comparable known devices.

As explained in greater detail below, this invention involves phase shifters constructed using small-scale fabrication techniques. This invention also encompasses phase shifters made using other fabrications techniques which result in comparable devices.

The present invention takes advantage of the extremely small mechanical actuators which can be assembled using small-scale fabrication techniques, and so significantly reduces the room needed on a chip for optical switches. These more compact switches require less chip space and so provide for denser integration of a plurality of optical devices in an optical component. This invention also takes advantage of the strong photon confinement properties of small-scale waveguides, such as are disclosed in U.S. Pat. Nos. 5,878,070 and 5,790,583. Together these developments facilitate construction of optical devices that provide the benefits and advantages of the present invention.

One embodiment of the present invention involves a Mach-Zehnder interferometer having a single input, a single output, and asymmetric first and second arms extending along an optical path direction of the interferometer. One arm, preferably the longer arm, has a phase shifter disposed therein. Alternatively, the phase shifter could be located in the shorter arm. When the phase shifter is actuated an optical signal propagating through the arm having the phase shifter will experience a phase shift relative to an optical signal propagating through the other arm. This phase shift is in addition to the inherent biasing phase shift which results from the different lengths of the two interferometer arms. The phase shifter can apply either a variable or a fixed phase shift.

In accordance with the present invention, an asymmetric MZI may be constructed with a selectively moveable phase shifter in one of the two different-sized interferometer arms. hat phase shifter may be moved into and out of an optical path defined by and through that interferometer arm so as to introduce a phase shift into an optical signal propagating in and through that arm. In so doing, the phase shifter changes the optical length of that arm, when compared with the optical length of the other interferometer arm. The total relative phase shift between the optical signals traveling in the two interferometer arms is the sum of the biasing phase shift and the applied phase shift. The phase shifter may be generally wedge-shaped, rectangular, square, stepped (on one or both sides), or other shapes, provided that such shapes may be utilized to introduce a phase shift into the optical signal.

While it is generally known to provide an asymmetric MZI as an element of an optical switch, an asymmetric MZI constructed in accordance with the embodiments of the present invention provides significant advantages over prior art asymmetric MZI devices and optical switches. For example, the minute size of the MZI enables construction of smaller optical switches that consume less on-chip real estate. The power requirements of the MZI to effect a desired phase change in an optical signal are also significantly reduced when compared with prior art MZI devices.

The invention accordingly comprises the features of construction, combination of elements, and arrangement of parts which will be exemplified in the disclosure herein, and the scope of the invention will be indicated in the claims.

BRIEF DESCRIPTION OF THE DRAWINGS

In the drawing figures, which are not to scale, and which are merely illustrative, and wherein like reference characters denote similar elements throughout the several views:

FIGS. 15A and 15B depict the assembly of an optical switch in accordance with an embodiment of the present invention;

FIGS. 16A and 16B are partial side cross-sectional views showing portions of the structure of optical switches in accordance with the present invention manufactured using flip-chip and monolithic fabrication techniques, respectively, together with external components and connecting hardware.

DETAILED DESCRIPTION OF THE PRESENTLY PREFERRED EMBODIMENTS

The present invention is directed to optical devices employing an asymmetrical Mach-Zehnder interferometer ("MZI") device having a phase shifter provided in one of the two different-length interferometer arms. The present invention enables the construction of significantly smaller optical devices than typical photonic devices, and significantly reduces the amount of on-chip real estate occupied by such devices, while not affecting the ability of such devices to introduce a predetermined phase shift in an optical signal.

The present invention takes advantage of the extremely small mechanical actuators which can be fabricated using small-scale fabrication techniques, and so significantly reduces the room needed on a chip for optical switches. These more compact switches require less chip space and so provide for denser integration of a plurality of optical devices in an optical component.

As used herein, an "analog switch" has more than two output states. The term "light" as used herein should be construed in the broadest possible sense. For example, the term "light" is intended to include visible electromagnetic radiation, as well as infrared and ultraviolet radiation. The term "waveguide", as used herein, refers generally to a photonic-well or photonic-wire structure that provides strong photon confinement. The term waveguide is not intended as a limitation on the construction, shape, materials, functionality, or any other aspect of the optical device of the present invention, but merely as a general reference.

Figure 1:
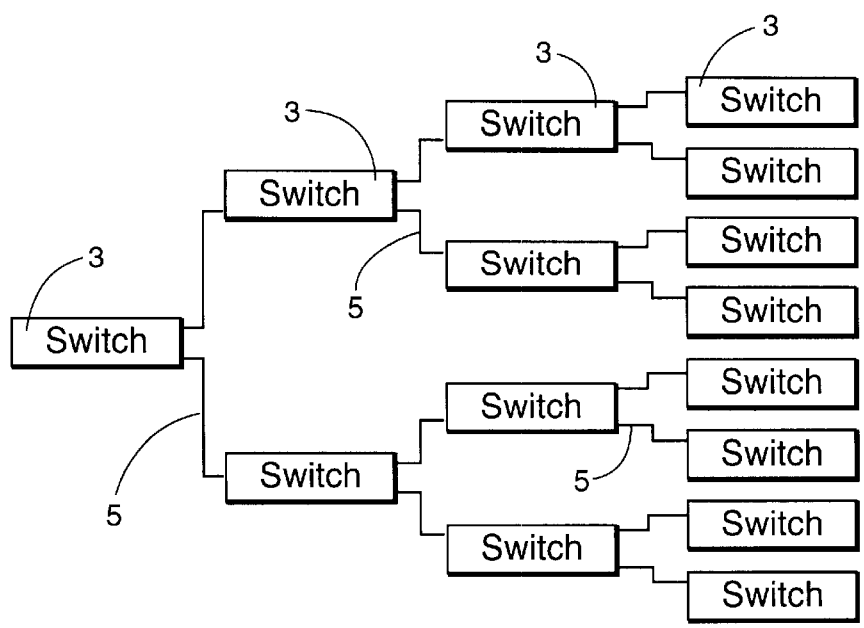
FIG. 1 is a schematic block diagram of a 1×16 switch that is part of a high-density optical component.
Figure 2:
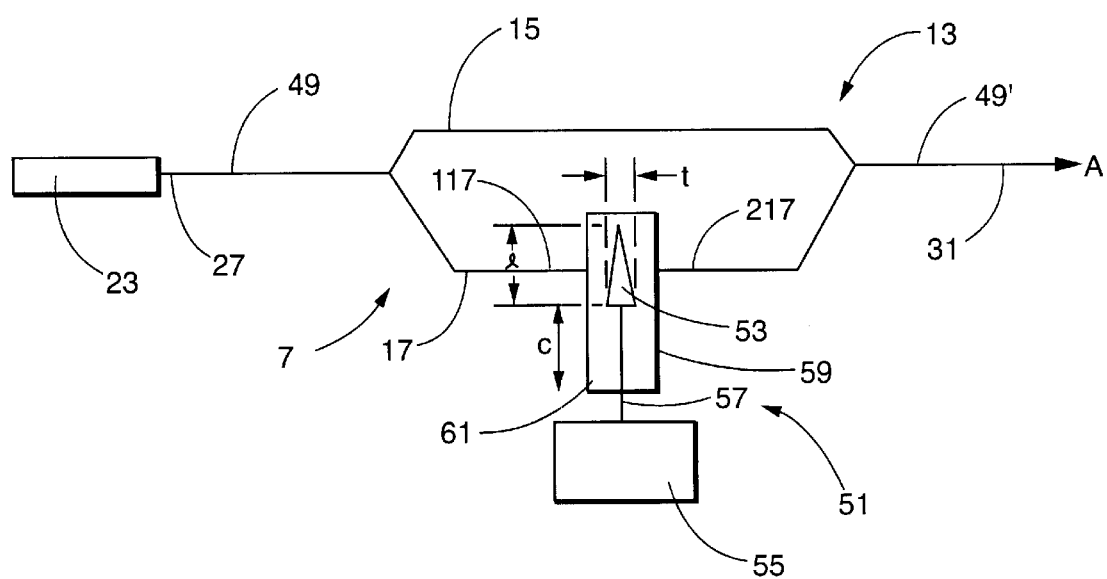
FIG. 2 is a schematic diagram of a 1×1 optical switch having an asymmetrical Mach-Zehnder interferometer constructed in accordance with the present invention.

Referring now to the drawings in detail, and with initial reference to FIG. 2, an asymmetrical Mach-Zehnder interferometer (MZI) 13 is used to construct a 1×1 optical switch 7. The switch 7 may receive at an input 27 an optical signal input via an input waveguide 49 and from an optical source 23, which by way of example and not limitation may include a laser, fiber-optic cable, or other upstream (along the optical path direction) light generating or light propagating device or system. The optical signal may be a single- or multi-wavelength signal. An output 31 via output waveguide 49' is controllable by the MZI 13, as described in more detail below.

The MZI 13 has first and second arms 15, 17 optically connecting the input 27 through input waveguide 49 to output waveguide 49' and the output 31. Light travels along an optical path defined by and through the input and output waveguides 49, 49' and the MZI arms 15, 17 in a direction generally indicated by arrow A in FIG. 2. Arms 15, 17 are of different lengths. In contrast to known MZI devices, the present invention provides a small phase shifter 51 in one MZI arm to introduce a phase shift into an optical signal propagating in and through that arm and thus control the output 31 of the MZI 13 and in turn an optical switch 7 that includes the inventive MZI 13. While it is thought to be preferable to provide the phase shifter 51 in the longer arm 17, phase shifter 51 could in the alternative be provided in the shorter arm 15.

With continued reference to FIG. 2, the optical signal traveling along input waveguide 49 splits approximately and preferably equally (in terms of signal amplitude or power) to each of the first and second arms 15, 17 of the MZI 13. After passing through each of the first and second arms 15, 17, the divided optical signal is recombined and then transmitted along output waveguide 49' to output 31.

It will be appreciated that the asymmetric first and second arms 15, 17 of the MZI 13 effect a constant biasing phase shift for any optical signal through the device. This phase shift, which can have a value of between 0–180° ($\pi$), is a function of the difference in optical lengths (the product of the actual length of the arm and its refractive index n) of those arms. An additional phase shift can be applied by way of the phase shifter 51 positioned in the longer second arm 17.

The built-in phase difference $\Delta\phi$ for the switch 7 shown in FIG. 2 is given by the equation:

$$\Delta\phi = \frac{2\pi}{\lambda} n_{eff}(L - L_b) \tag{2}$$

where $\lambda$ is the wavelength of the optical signal passing through arms 15, 17, $n_{eff}$ is the effective refractive index of the waveguide of the second interferometer arm 17, L is the length of that arm 17, and $L_b$ is the actual length of arm 15.

For various values of $\lambda$, the phase shift given by Equation 2 equates to an integer multiple of $\pi$. At these $\lambda$ values, the optical signal at one of the output ports will be at a maximum while at the other output port will be at a minimum. The situation is reversed at those wavelengths for which the phase shift equals to a half-integer multiple of $\pi$. Thus, the signals A, B at the two outputs 31, 33 of the MZI 13 are periodic functions of wavelength with a periodicity given by:

$$\frac{\Delta\lambda}{\lambda} \approx \frac{\lambda}{n_{eff}\Delta L} \tag{3}$$

where $\Delta L=(L-L_b)$ and the other variables already have been defined in connection with Equation 2. To tune each MZI 13 over its complete periodic operating range, the differential path length (i.e., $\Delta L$) need only be varied by a maximum of $\lambda/2$.

More specifically, the output intensity of a 2-port device, composed of a Mach-Zehnder interferometer (MZI) preceded and followed by 3 dB optical couplers, will be $$P_1 = P_0 \sin^2(\phi/2) \tag{4A}$$

in the upper output port, and $$P_2 = P_0 \cos^2(\phi/2) \tag{4B}$$

in the lower output port, where $P_0$ is the intensity of the input signal, and $\phi$ is the accumulated phase difference between the optical fields propagating through the different arms of the interferometer. By choosing $\phi=(2m+1)\pi$, with m an arbitrary integer, an input signal can be directed to the upper port. The choice $\phi=2m\pi$, alternatively, will direct the input signal to the lower port.

In the simple case of an asymmetric MZI, where the interferometer arms differ only in length, the accumulated phase difference is $$\phi = \frac{2\pi n}{\lambda}\Delta L \tag{5}$$

where n is the index of refraction of the material in the arms of the interferometer,
$\lambda$ is the wavelength of the optical signal, and $\Delta L$ is the length difference between the two arms. If two simultaneous optical signals, with wavelengths $\lambda_1$ and $\lambda_2$, are input to the device, then $\Delta L$ can be chosen so that $$\phi_1 = \frac{2\pi n}{\lambda_1}\Delta L = (2m_1+1)\pi \quad \text{and} \quad \phi_2 = \frac{2\pi n}{\lambda_2}\Delta L = 2m_2\pi \tag{6A, 6B}$$

for some integers $m_1$ and $m_2$, then the first signal with wavelength $\lambda_1$ will be sent to the upper output port, while the second signal with wavelength $\lambda_2$ will be sent to the lower output port.

Notwithstanding the unique construction of the phase shifter formed in the longer second 17 provided by the present invention, the asymmetric MZI 13 of the present invention functions in a fashion similar to other asymmetric Mach-Zehnder devices. A total phase shift of between 0–180° ($\pi$), this being the sum of the biasing phase shift resulting from the difference in arm lengths, and the applied phase shift due to the phase shifter 51, may be introduced into an optical signal propagating in the interferometer's longer second arm 17. This total phase shift will determine how light is output from the switch 7. The mechanism through which such an asymmetric 1×1 MZI switch routes light passing from the input to the output paths is known, and so need not be described.

In accordance with the present invention, a phase shifter 51 is provided in one interferometer arm 17 (again, which arm is a routine matter of design choice). With continued reference to FIG. 2, and with additional reference to FIGS. 5A and 5B, one embodiment of the phase shifter 51 of the present invention will now be described in detail. The interferometer arm 17 in which the phase shifter 51 is provided is non-continuous, although defining a continuous optical path. Thus, that interferometer arm 17 comprises two waveguides 117, 217, separated by a region or trench 59 within which is provided the phase shifter 51. An optical signal propagating in and through the interferometer arm 17 will pass through phase shifter 51 or not, depending upon whether phase shifter 51 is positioned in or out of the optical path defined by and through that waveguide 117, trench 59 and waveguide 217. When the phase shifter 51 is positioned in the optical path, the phase of an optical signal propagating in and through interferometer arm 17 may be changed, depending upon the position and construction of the phase shifter 51, as described in more detail below.

Figure 8A:
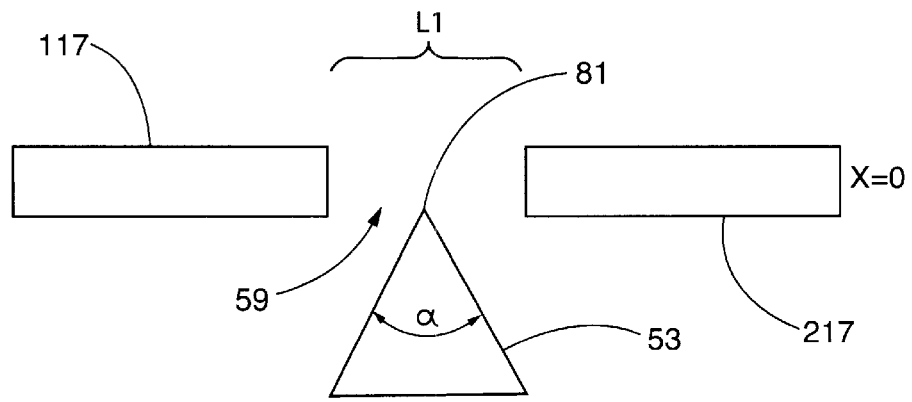
FIGS. 8A and 8B are top schematic views showing a phase shift element positioned out of and in an optical path defined by and through two waveguides.
Figure 8B:
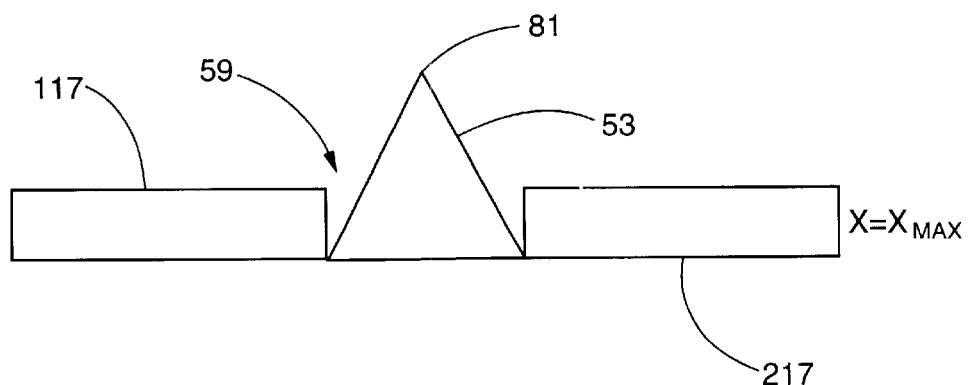

In one embodiment of the present invention, depicted in FIGS. 2, 5A, 8A and 8B, the phase shifter 51 comprises a tapered or wedge-shaped phase shift element 53 connected to an actuator 55 by a link 57. That actuator 55 and link 57 may cause selective movement of the phase shift element 53 into and out of the optical path, thus changing the phase of an optical signal propagating in and through interferometer arm 17 (and waveguides 117, 217). For example, when the phase shift element 53 is positioned as depicted in FIG. 8A (i.e., out of the optical path), an optical signal propagating in and through the interferometer arm 17 will pass from waveguide 117 to waveguide 217 across trench 59 without experiencing any phase shift apart from that resulting from the longer arm 17. In this case, the only phase shift between the optical signals traveling through the asymmetrical arms 15, 17 is a result of the arms' different lengths. On the other hand, when the phase shift element 53 is positioned as depicted in FIG. 8B, the optical signals traveling through the asymmetrical interferometer arms 15, 17 will have a phase shift therebetween. The magnitude of that phase shift will depend upon both the biasing phase shift due to the arms' different lengths, and the phase shift applied by the phase shift element 53.

If desired, phase shifter 51 could be arranged so that actuator 55 is disposed between arms 15, 17.

Generally, phase shift element 53 is constructed of optically transparent material such as, by way of non-limiting example, silicon. The element 53 preferably has certain optical qualities, in particular, a refractive index different from that of the waveguides 117, 217 and from the medium provided in the trench 59, which may be air or a vacuum, for example. Light passing between the waveguides 117, 217 and through the phase shift element 53 will experience a change in velocity and thus a phase shift due to the difference in refractive indices. Since the phase of light passing through phase shift element 53 is affected by both the phase shift element's index of refraction and its width, these values can be selected to impart the desired phase shift(s). It is presently preferable for the phase shift element 53 to introduce a phase shift ranging from approximately 0° when the element 53 is not in the optical path, to substantially 180° ($\pi$) when the element 53 is in the optical path 53. For a tapered or wedge-shaped element 53, such as depicted in FIG. 2, a range of phase shifts may be selected, depending upon the size and shape of the element 53. Alternative embodiments of the phase shift element 53 in accordance with the present invention may also provide a range of phase shift values (see, e.g., FIGS. 10A–10C).

Figure 5A:
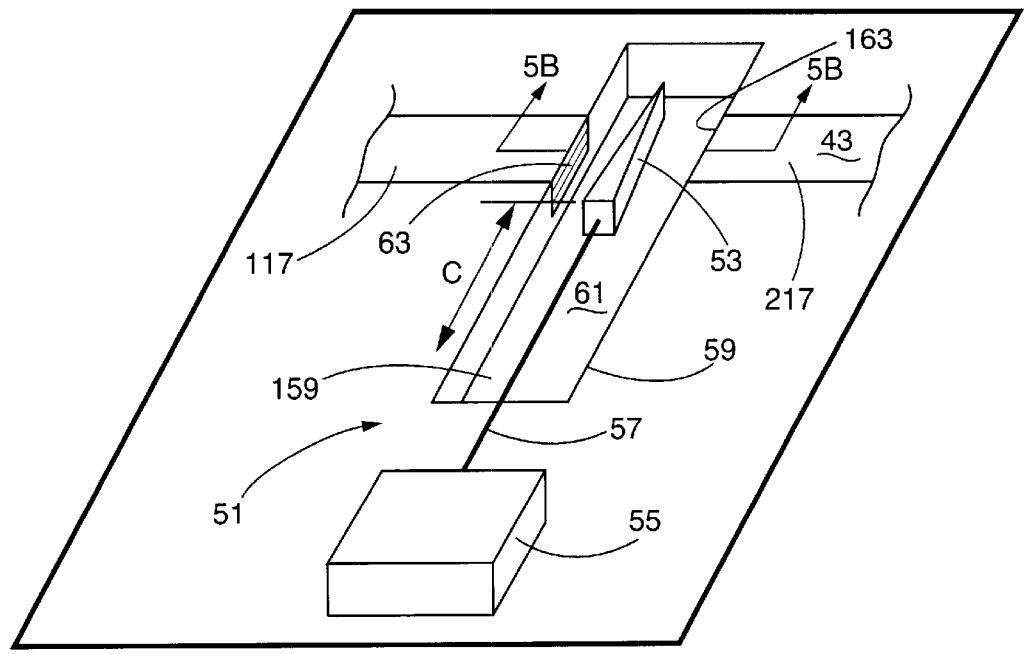
FIG. 5A is a perspective view of a phase shifter constructed in accordance with an embodiment of the present invention.

With continued reference to FIGS. 2 and 5A, phase shift element 53 is preferably tapered, or wedge-shaped with a height h sufficient to completely intercept and thereby shift light passing between waveguides 117 and 217 when the phase shift element 53 is positioned in the optical path.

The phase shift element 53 has a length l that is preferably minimized to reduce the distance by which the phase shift element 53 is moved between the first and second positions (i.e., positions in and out of the optical path, for example), or the distance by which the element 53 is moved to change the phase shift from one value to another. The minimized length l may also reduce the power needed to cause the phase shift element 53 to move into and out of the optical path and improves the switch's response speed. By way of non-limiting example, the phase shift element 53 could range from approximately 20–70 $\mu$m in length.

Phase shift element 53 preferably has a maximum width t. Since the width t of the phase shift element 53 directly affects the insertion loss through the MZI 13 and switch 7, a thinner phase shift element 53 may be preferred. Optical loss of light due to light diffraction in the trench 59, also can be minimized by having the smallest possible phase shift element width t.

Figure 4:
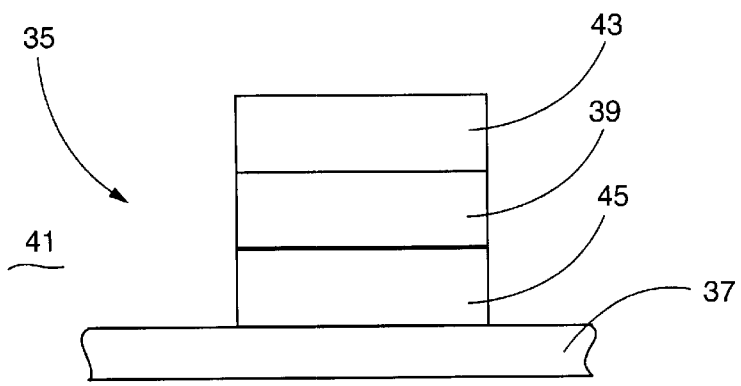
FIG. 4 is a cross-sectional view of a photonic-wire waveguide.

With continued reference to FIG. 2, a preferred construction of an asymmetric MZI 13 and switch 7 in accordance with the present invention will now be discussed in detail. The switch 7 and MZI 13 are generally constructed as waveguides, such as depicted in FIG. 4, which depicts an illustrative, non-limiting cross-sectional representation of a strongly confined waveguide 35. The waveguide 35 is constructed on a substrate 37 and is comprised of a relatively high (e.g., n=3.5) refractive index core 39 surrounded on at least two sides (in the horizontal direction in FIG. 4) by a relatively low refractive index medium 41 such as air. The core 39 is sandwiched between upper and lower cladding layers 43, 45.

The present invention contemplates waveguides constructed in lithium niobate, silica/glass, and other semiconductor materials provided that strong confinement (at least in the horizontal direction in FIG. 4) is achieved.

With continued reference to FIG. 4, the waveguide 35 there depicted in cross-section may comprise either a photonic-well or a photonic-wire waveguide. Exemplary photonic-wire and photonic-well devices are respectively disclosed in U.S. Pat. Nos. 5,878,070 and 5,790,583, the entire disclosure of those patents being incorporated by reference herein. The waveguide 35 can be formed of semiconductor materials for on-chip integration with other devices such as a semiconductor laser. A wafer epitaxial growth process, or other now known or hereafter developed semiconductor fabrication process, may be used to form the various semiconductor layers of the waveguide 35 on the substrate 37. As depicted in FIG. 4, a lower cladding layer 45, preferably of $SiO_2$, is formed on the substrate 37, preferably silica-based (e.g., Si). A core 39 is formed on the first cladding layer 45 and, by way of non-limiting example, may be made from silica. An upper cladding layer 43, also preferably of $SiO_2$, can be formed on the core 39.

For a photonic-wire construction, the refractive index of the core 39 is generally greater than that of all of the upper and lower cladding layers 43, 45, and the surrounding medium 41. In a photonic-wire waveguide 35, the upper and lower cladding layers 43, 45 have a very low refractive index as compared to the refractive index of the core 39 and thus strongly confine photons in all directions about the waveguide core 39. Typical low refractive index mediums for use in practicing the present invention have refractive index below about 2.0, preferably below 1.6, such as from about 1.5 to about 1.0. The ratio of the refractive indices between the core 39 and each of the upper and lower cladding layers 43, 45 and the surrounding medium 41 is preferably larger than about 1.3.

For a photonic-well construction, the refractive index of the core 39 is generally greater than that of the surrounding medium 41, with the upper and lower cladding layers 43, 45 having a refractive index close to that of the core 39 and thus weakly confine photons within the waveguide 35 in the vertical direction. However, strong lateral confinement is still provided by the difference between refractive index of the core 39 and the relatively low refractive index cladding medium 43, 45 laterally surrounding the core 39. In a photonic-well waveguide 35, the cladding layers 43, 45 may have a refractive index of about 3.17 as compared to the refractive index of 1 for air or of 1.5 for silica. The refractive index of cladding layers 43, 45 is slightly less than the refractive index of core 39, which is preferably about 3.4.

The core 39 can be rectangular, with sides running from approximately 3–10 thick (high) and approximately 3–15 μm wide. More preferably, the core 39 is square, with sides from approximately 6–8 μm thick and approximately 6–14 μm wide. The upper and lower cladding layers 43, 45 adjacent to core 39 can be approximately 3–18 μm thick, and are preferably approximately 15 μm thick.

The present invention will work with both weakly-confined waveguides and strongly-confined waveguides. Presently, use with weakly-confined waveguides is preferred.

Presently it is believed that silica-based ($SiO_2$) materials are thought to be preferable for constructing waveguides for the various embodiments of the present invention. In particular, core 35 might include germanium oxide doped silica deposited atop a silica substrate 37, while cladding 43 and 45 may include boron-phosphine doped silica glass. Other exemplary and non-limiting materials which could be used for the core 39 include indium phosphide and gallium arsenide, and the cladding 43, 45 could be made with indium phosphide, gallium arsenide, aluminum oxide, silicon nitride or polymers, or some combination thereof. By way of example only, silicon or quartz substrates also could be used.

Figure 3:
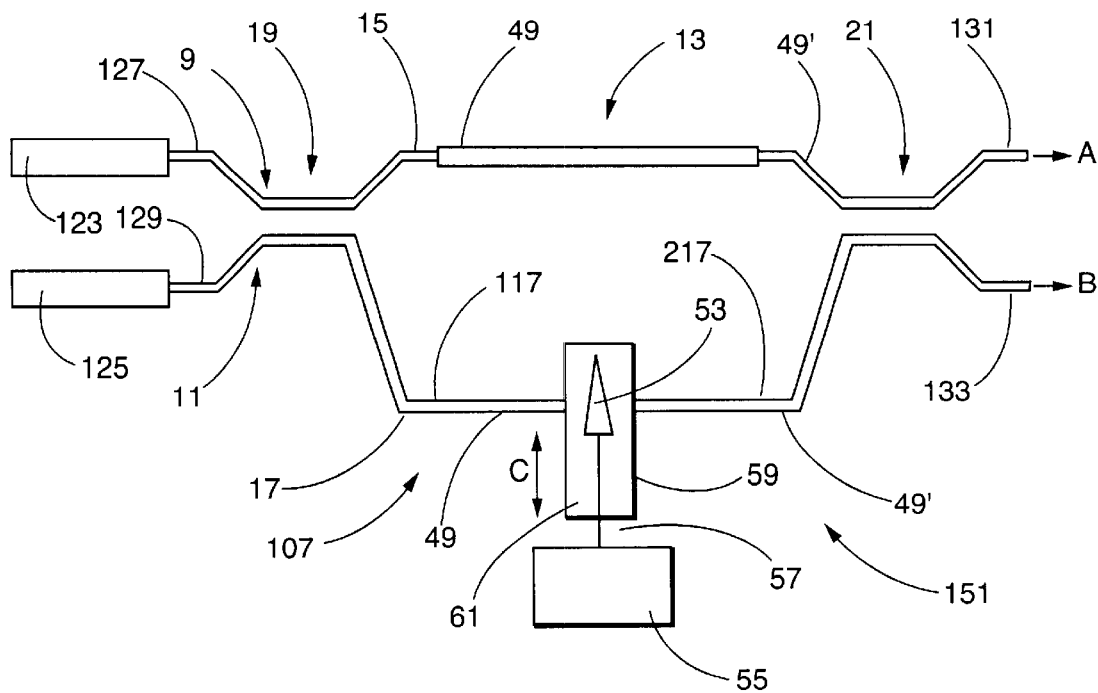
FIG. 3 is a schematic diagram of a 2×2 optical switch having an asymmetrical Mach-Zehnder interferometer constructed in accordance with the present invention.

Referring next to FIG. 3, a 2×2 optical switch 107 having two branches 9, 11 and constructed in accordance with another embodiment of the present invention is depicted. The switch 107 includes an asymmetric MZI 13 having first and second arms 15, 17 optically connecting an input coupler 19 and an output coupler 21 along an optical path direction of the switch 107, generally indicated by arrows A and B. First arm 15 is preferably some fraction of the length of the second arm 17. As an alternative to the foregoing, Y-branches or multi-mode interferometer (MMI) couplers may be provided, as a routine matter of design choice.

The switch 107 may receive an optical signal input from either one of two optical sources 123, 125, each of which may, by way of example only, and not in a limiting sense, include a laser, fiber-optic cable, or other upstream (along the optical path direction) light generating or light propagating device or system. A first optical signal may be directed into an input 127 of the switch 107 by first optical source 123. The first optical signal may comprise a single- or multi-wavelength signal, and as explained hereafter may be selectively switched in a known manner to either output 131 or 133. Similarly, and alternatively, a second optical signal may be directed into an input 129 by a second optical source 125, and may also be selectively switched to either of output 131 or 133. The optical signal output from the switch 107 via outputs 131 and 133 are sine and cosine functions of wavelength, respectively (as described in greater detail below), and thus are complementary.

With continued reference to FIG. 3, an optical signal from an optical source 125 or 127 may pass through an input coupler 19 which functions as a 50:50 splitter to direct approximately one-half (in terms of signal amplitude or power) of the input optical signal to each of the first and second arms 15, 17 of the MZI 13. The split optical signal passes through each of the first and second arms 15, 17, is recombined by an output coupler 21, and is then output from either output 131 or 133, according to the phase shift introduced in the optical signal by the MZI 13. Actuating the phase shifter 51 causes an optical signal propagating in arm 17 to undergo a phase shift. This phase shift is separate from and combines with the inherent phase shift which results from the different lengths of arms 15, 17. The non-phase shifted optical signal (propagating through first branch 9 and first arm 15) combines with the phase shifted optical signal (propagating through second branch 11 and longer second arm 17) via the output coupler 21.

In known manner the optical signal may be switched between the two output ports 131 and 133 of the switch 107 according to the combined relative phase shift between the two arms 15, 17 of the MZI 13.

The two output ports 131, 133 of the switch 107 are complementary and respectively provide in known manner an optical signal of the form $P_A=\sin^2(\Delta\phi/2)$ and $P_B=\cos^2(\Delta\phi/2)$ Consequently, the combined relative phase shift between the two arms 15, 17 of the interferometer 13 will determine how the optical signal is switched between the two output ports 131, 133 of the switch 107.

A tapered phase shift element 53 may require a relatively precise actuator 55 to effect the desired movement of the element 53 into and out of the optical path, or within the optical path, as described herein. For a tapered phase shift element 53, the actuator 55 must cause the phase shift element 53 to move from position out of the optical path to a particular and relatively precise position so that the optical signal passes through the phase shift element 53 at a particular thickness and the desired phase shift is introduced into the optical signal. For example, consider a tapered phase shift element 53 having a $\pi/(50\,\mu m)$ (maximum phase shift amount over length) phase shift element 53 positioned so as to introduce a π/6 phase shift into an optical signal. If it is desired to change that phase shift from π/6 to π/3, it will be necessary to increase the phase shift by π/6. This will require moving the phase shift element 53 by approximately 8 μm, as show clearly in equation (2); which may be used to calculated the amount of movement required of the element 53 for a desired phase shift.

$$\frac{(\pi/3)-(\pi/6)}{\pi/(50\mu m)}=8\mu m \tag{7}$$

It will be appreciated that such small movement requires precise control of the position of the wedge-shaped phase shift element 53.

One alternative to a more accurate actuator 55 is a more gradually sloping phase shift element 53. For example, halving the phase shift element's taper will double the distance by which the phase shift element 53 would have to be moved to cause the same magnitude phase shift. This effectively increases the accuracy of the actuator 55. For example, a phase shift element 53 having a length approximately equal to 50 μm and constructed to introduce a π phase shift into an optical signal would have sides 87, 89 that slope at a rate approximately twice that of a 100 μm phase shift element 53.

Other than inducing a phase shift, the material used in the phase shift element 53 should not significantly alter (i.e., absorb) the characteristics of the light which passes therethrough.

Figure 9:
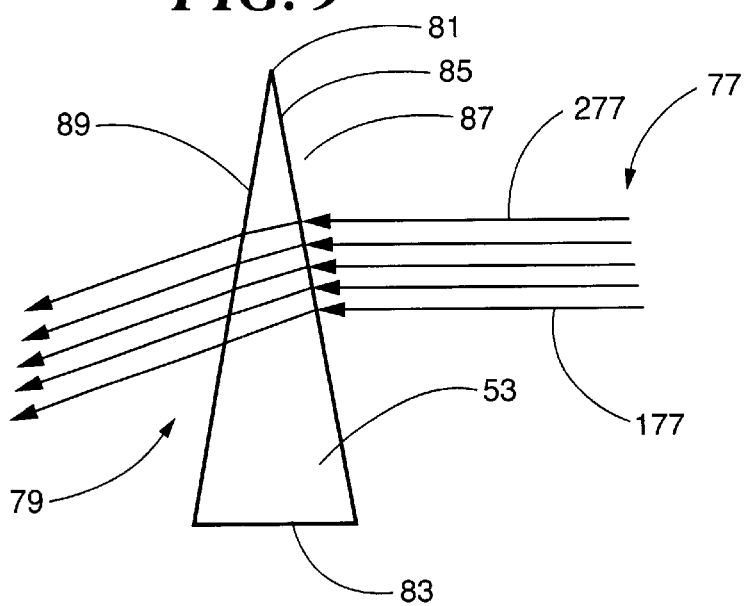
FIG. 9 is a top view of a tapered phase shift element constructed in accordance with an embodiment of the present invention.

Referring next to FIG. 9, the effect of a tapered phase shift element 53 on an optical signal or light beam 77 is there depicted. Since the amount of phase shift introduced into an optical signal by the phase shift element 53 is determined, at least in part, by the thickness of the element 53, an element 53 having a variable thickness may be used to introduce a selectable, variable phase into an optical signal.

The tapered sides 87, 89 of the phase shift element 53 may cause an optical signal to experience a non-uniform phase shift over the width of the optical signal light beam 77. Since the amount of phase shift introduced into the optical signal depends, at least in part, upon the thickness of the phase shift element 53, the light beam will encounter varying thicknesses simply because the light beam has a finite width. Consequently, an edge 177 of the light beam encountering a wider part of the phase shift element 53 will experience a greater phase shift than an edge 277 of the light beam encountering a narrower part. If the width of the light beam 77 is relatively small in comparison to the length of the phase shift element 53, the difference in phase experienced at the edges 177, 277 of the light beam 77 may be too small to adversely effect further transmission of the optical signal and thus may not require correction or compensation.

If, however, correction or compensation is desired, one way to reduce the difference in phase shift would be to use a very gradually tapered phase shift element 53 so that the light beam 77 experiences relatively negligible difference in thickness of the element 53 over the width if the light beam 77 thus providing a more homogeneously phase shifted optical signal. Such a phase shift element 53 could be capable of producing as wide a range of phase shifts as a more sharply tapered phase shift element 53, although more movement of the phase shift element 53 would be required.

Figure 5B:
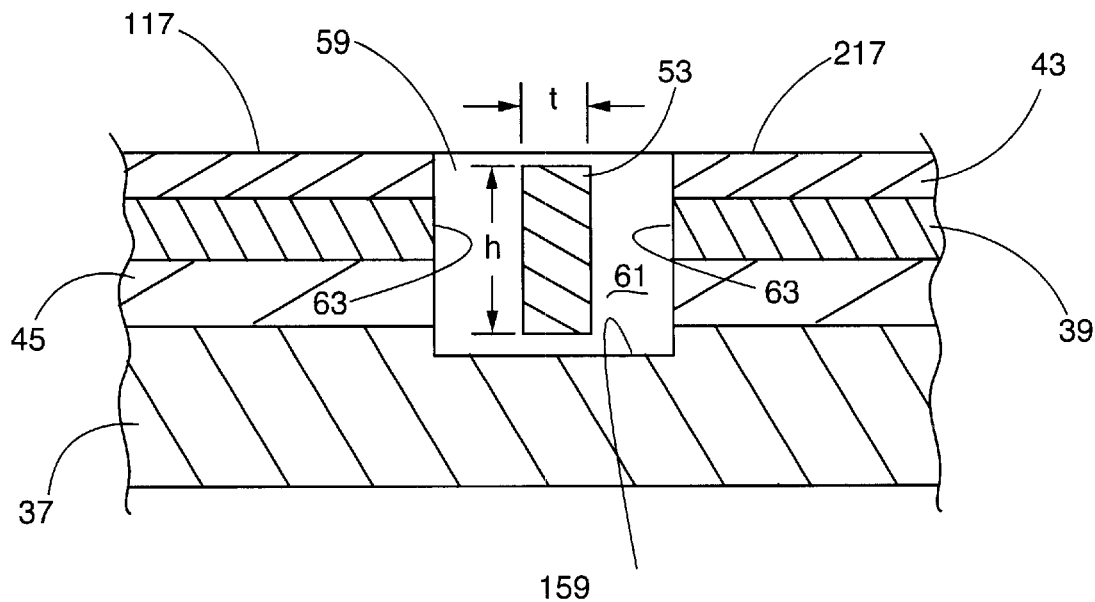
FIG. 5B is a cross-sectional view taken along line 5B—5B of FIGS. 5A and 6.

With reference to FIGS. 2, 5A and 5B, phase shift element 53 is preferably oriented approximately perpendicular to the optical path direction, indicated by arrow A in FIG. 2. Phase shifter 51 enables a user to select, within limits, the amount by which the phase of light traveling along the second arm 17 is changed.

Figure 10A:
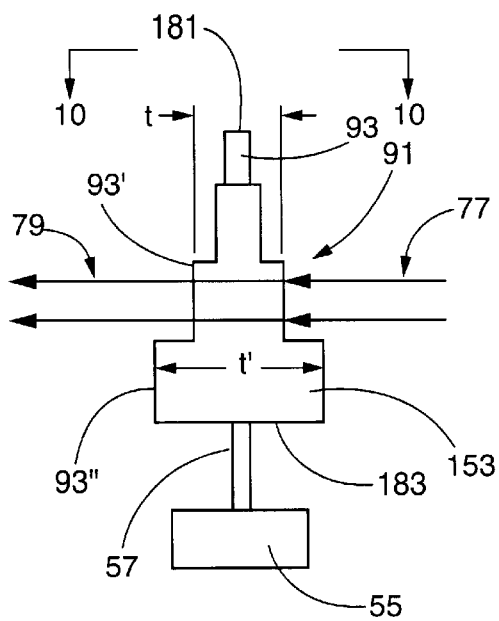
FIG. 10A is a top cross-sectional view of an alternate embodiment of a phase shift element constructed in accordance with the present invention.
Figure 10B:
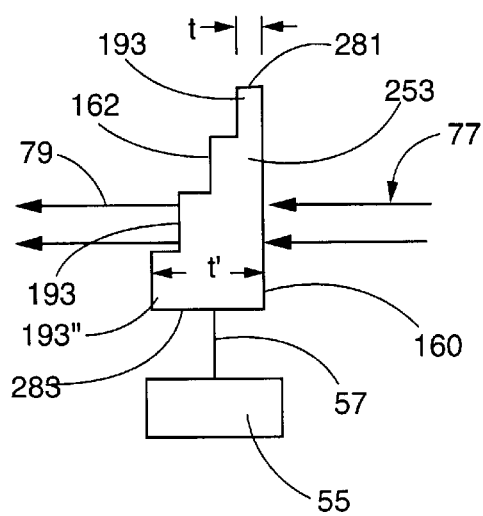
FIG. 10B is a top cross-sectional view of still another embodiment of a phase shift element constructed,in accordance with the present invention.
Figure 10C:
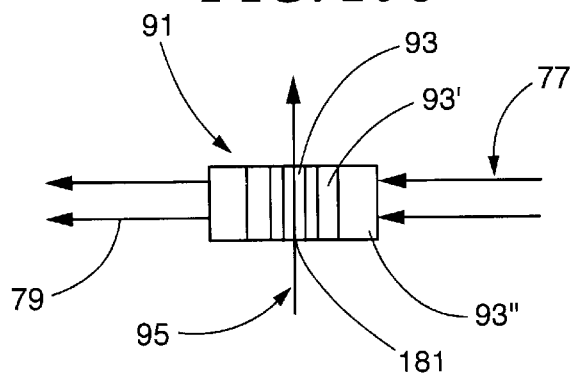
FIG. 10C is a front elevational view taken along line 10—10 of FIG. 10A.

Alternate embodiments of phase shift elements 153, 253 in accordance with the present invention are depicted in FIGS. 10A–10C. With regard to FIGS. 10A and 10C, the stepped phase shift element 153 consists of two or more different rectangular phase shift regions 93, 93', 93" having different thicknesses, t, t', t". Since the phase shift of light passing through each phase shift region 93, 93', 93" is a function of the phase shift region's thickness, it will be understood that thicker phase shift regions introduce a greater phase shift than thinner phase shift regions. Instead of allowing an infinite range of phase shifts from 0–180°, as is possible with a tapered phase shift element 53, this arrangement provides for a discrete number of phase shifts.

The number of phase shifts possible using a stepped phase shift element 153 as depicted in FIGS. 10A–10C will correspond to the number of phase shift regions 93, 93', 93". For example, a six-step phase shift element could provide phase shifts approximately equal to $\pi/6$, $\pi/3$, $\pi/2$, $\pi/3$, $5\pi/6$ and $\pi$ (it is presently not believed that more than ten such phase shift regions 93 would be needed). When configured as depicted in FIG. 10A, or alternatively, with the smallest thickness being located near the link 57, the stepped phase shift element 153 provides monotonic phase shifting of an optical signal. Alternatively, non-monotonic phase shifting may also be provided, as a routine matter of design choice.

When viewed from one end, such as depicted in FIG. 10C, for example, the stepped phase shift element 153 can be seen to have a number of phase shift regions 93, 93', 93" all arranged symmetrically about a common center plane 95 defined through the element 153. Alternatively, as depicted in FIG. 10C, the stepped phase shift element 253 may have a stepped side 162 and a flat side 160, with either side serving as an input or output for the optical signal as it propagates between the waveguides 117, 217 of the interferometer arm 17.

Individual phase shift regions 93, 93', 93" of the stepped phase shift element 153, 253 need not be arranged either symmetrically. For example, phase shift regions 93, 93', 93" could be arranged so that the most frequently used phase shift regions are adjacent to one another (not shown). This arrangement will reduce the distance by which the phase shift element 153, 253 would have to be moved to place those most used phase shift regions in the optical path. Since the phase shift element 153, 253 has to be moved a shorter distance, the phase shifter's response time would be improved.

The stepped phase shift element 153, 253 can be fabricated either as a single integral piece or an assembly of several suitably-aligned pieces adhered or bonded together. Fabricating a single integral piece may be preferable because that avoids the need to align precisely the assembled pieces, and also avoids deformations in the optical material which might be caused by the adhering or bonding of the several pieces.

Another benefit to using a stepped phase shift element 153, 253 is that a less precise actuator 55 may be needed, since the minimum distance by which the phase shift element 153, 253 will have to be shifted is approximately equal to the distance between the centers of two adjacent phase shift regions. Given that the phase shift regions are themselves somewhat wider than the width of the light beam 152, the minimum amount by which the actuator 55 would move the phase shift element 153, 253 would be somewhat more than the width of the light beam 152.

To ensure that the light beam 152 does not simultaneously encounter two different, adjacent phase shift regions, the length of each region is preferably no less than the width of the waveguide 117, 217.

Actuator 55 serves to move the phase shift element 53, 153, 253 into and out of the optical path in the region or trench 59. While any suitable type of actuator could be used to implement this invention, it is presently thought that either an electrothermal or electromechanical type actuator would be preferred. Both types of actuators are for general purposes known in the art, and so will not be described in precise detail. For the purposes of this invention, it will be appreciated that any actuator could be used which sufficiently changes its size in response to the application of energy. In some cases, as will be evident from the foregoing discussion, large displacements of the phase shift element 53, 153, 253 may be necessary. There, electrothermal actuation may be preferred.

Figure 6:
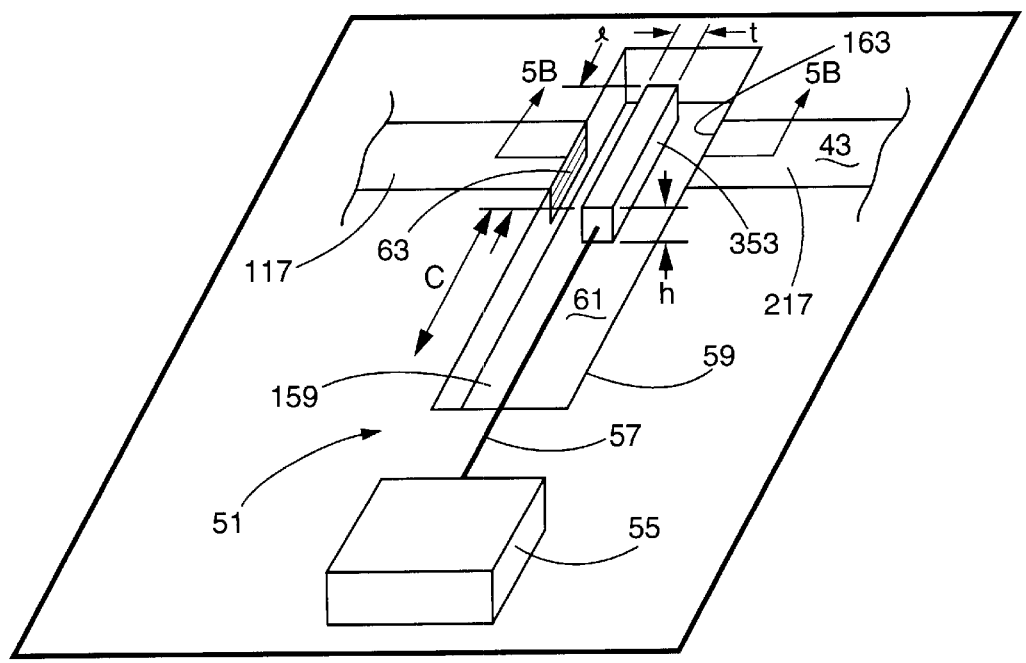
FIG. 6 is a perspective view of an alternate phase shifter constructed in accordance with an embodiment of the present invention.

In one embodiment of the present invention, depicted in FIG. 6, the phase shifter 151 preferably comprises a planar (rectangular prism) phase shift element 353 connected to an actuator 55 by a link 57. That actuator 55 and link 57 may cause selective movement of the phase shift element 353 into and out of the optical path, thus changing the phase of an optical signal propagating in and through interferometer arm 17 (and waveguides 117, 217). For example, when the phase shift element 353 is positioned as depicted in FIG. 6 (i.e., in the optical path), an optical signal propagating in and through the interferometer arm 17 will pass from waveguide 117 to waveguide 217 across trench 59 and experience a phase shift. On the other hand, when the phase shift element 53 is not positioned between the waveguides 117, 217 (not shown), the optical signal will not experience a phase shift. One of two different phase shifts can therefore by applied and removed as desired by moving the phase shift element 353 along the trench 59 between a first position in which the phase shift element 353 lies in the path of light traveling across the trench 59, and a second position in which the phase shift element 353 does not lie between the waveguides 117, 217 in that path.

Generally, phase shift element 353 is constructed of optically transparent material in like manner to the variable phase shift elements 53, 153, 253 already discussed. Since the phase of light passing through phase shift element 353 is affected by both the phase shift element's index of refraction and its width, these values can be selected to impart the desired phase shift. It is presently preferable for the phase shift element 353 to introduce a phase shift of either approximately 0° when the element 353 is not in the optical path, or approximately 180° (π) when the element 353 is in the optical path 353.

With continued reference to FIG. 6, phase shift element 353 is preferably a rectangular prism having a height h sufficient to completely intercept and thereby shift light passing between waveguides 117 and 217 when the phase shift element 353 is positioned in the optical path.

The phase shift element 353 has a length l that is preferably minimized to reduce the distance by which the phase shift element 353 is moved between the first and second positions (i.e., positions in and out of the optical path, for example), or the distance by which the element 353 is moved to change the phase shift from one value to another. The minimized length l may also reduce the power needed to cause the phase shift element 353 to move into and out of the optical path and improves the switch's response speed.

Phase shift element 353 preferably has a width t. Since the width t of the phase shift element 353 directly affects the insertion loss through the MZI 13 and switch 7, a thinner phase shift element 353 may be preferred. Optical loss of light due to light diffraction in the trench 59, also can be minimized by having the smallest possible phase shift element width t.

So that all of the light beam strikes the phase shift element 353, the height h and width t of the phase shift element 353 should be greater than the corresponding dimensions of the core 39 of waveguide 117.

Figure 17A:
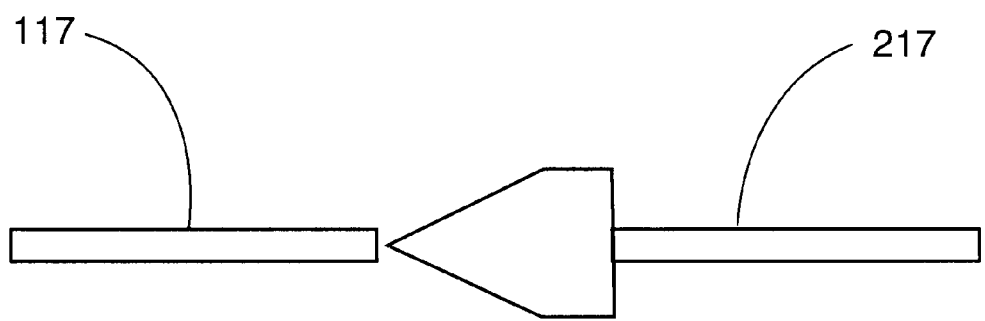
FIGS. 17A and 17B show the relationship between light beam diffraction and trench width for light passing across a trench between waveguides.
Figure 17B:
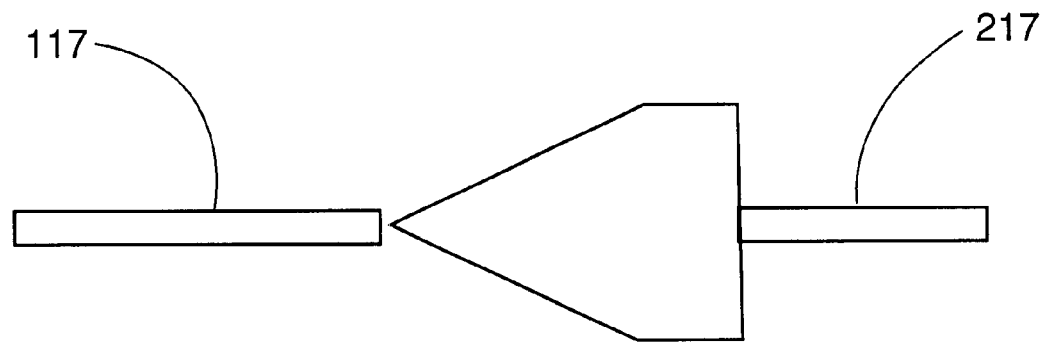

The width of the trench 59 between the waveguides 117, 217 is preferably minimized to reduce diffraction of the optical signal as it propagates across the trench 59 and between the waveguides 117, 217. For example, and as depicted in FIGS. 17A and 17B, greater diffraction of the optical signal is likely to occur with greater trench widths. Since the light diffracts more as the trench width increases, optical signal loss will occur from waveguide 117 to waveguide 217. It is therefore preferable to provide a trench 59 having as short a width as practical and to position the ends 63, 163 (see, e.g., FIGS. 8A and 8B) of waveguides 117, 217 as close to each other as possible.

The trench can be from approximately 8–40 μm wide. Preferably, the trench is approximately 12–20 μm wide.

The planar phase shift element 53 is preferably rectangular and can be from approximately 1–8 μm thick, approximately 10—100 μm high, and approximately 10–100 μm long. The tapered phase shift element 53 can have a thickness ranging from approximately submicron-size at the tip to 100 μm at the widest portion, length height from approximately 10–100 μm, and height of approximately 1–8 m. Both the planar and tapered phase shift elements can be made from any sufficiently rigid and light material. Preferably, the planar phase shift element 53 approximately 2 μm thick, approximately 30–40 μm high, and approximately 30–40 μm long. The tapered phase shift element 53 is preferably triangular, has a tip thickness of approximately submicron size, a maximum thickness of 30–40 μm, and a height of approximately 30–40 μm As an alternative non-limiting example, the phase shift element 353 could range from approximately 20—70 μm in length. By way of non-limiting example, the planar and tapered phase shift element 53 are preferably made from silicon. Other materials such as polymers, metallic materials or dielectric films also could be used.

There are several ways to control diffraction of the light as it crosses the trench 59. Diffraction can be controlled by separating the ends 63, 163 of waveguides 117, 217 by a distance only slightly greater than the widest part of the phase shift element 53, 153, 253 as depicted in FIGS. 8A and 8B. It is thus desirable to provide as narrow a trench 59 as possible to minimize light diffraction losses as light propagates through and across the trench 59. Trench widths ranging from approximately 12 to 20 μm are presently thought to be preferable.

At the same time there are factors which limit how narrow a trench 59 can be provided. A narrow trench 59 may complicate aligning the facing waveguides 117, 217, and may not be able to accommodate a phase shift element 53 of width sufficient to apply the maximum desired phase shift for the tuning range of interest.

Figure 11:
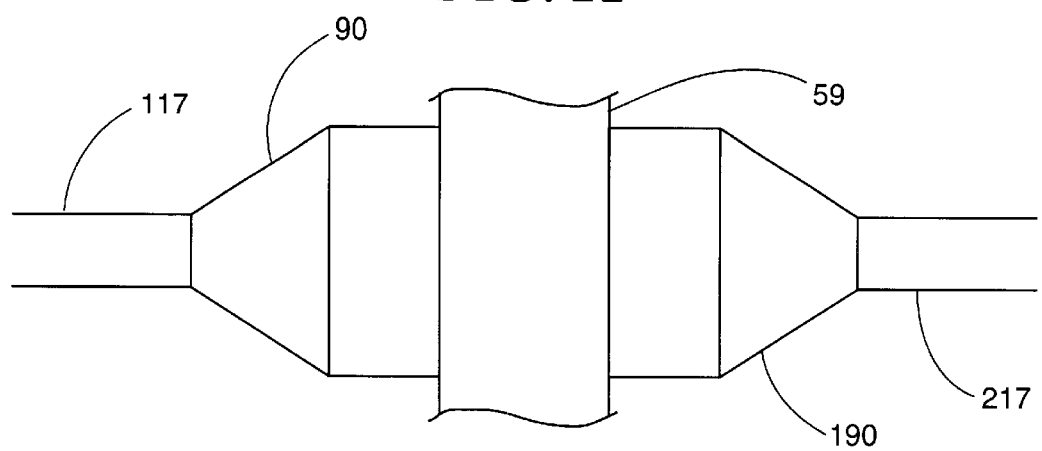
FIGS. 11 and 12 are schematic views showing two different ways to reduce diffraction of light passing between waveguides.

As depicted in FIG. 11, diffraction losses in wider trenches can be reduced by increasing the waveguide widths using tapers 90, 190 integrally formed as part of the waveguides 117, 217. Alternatively, the tapers 90, 190 may be separate components attached to the waveguides 117, 217.

Moreover, only one of the two tapers 90, 190 could be provided. In such an embodiment, only output waveguide 217 would be provided with taper 190, so that light would leave input waveguide 117, pass through trench 59, enter taper 190 and from there enter into waveguide 217.

Figure 12:
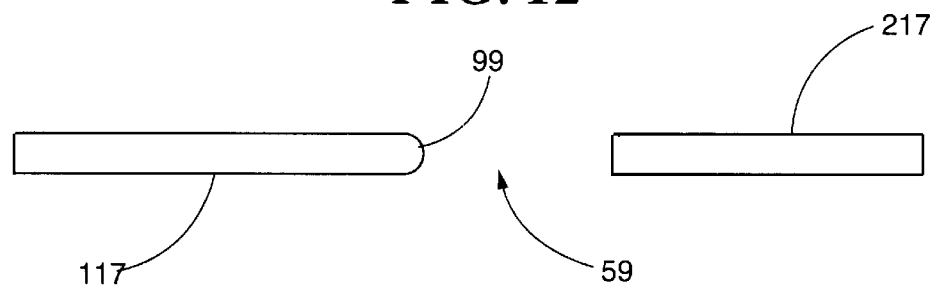

With reference to FIG. 12, a lens 99 may be provided at an output of waveguide 117 to minimize the diffraction of light as it exits the waveguide 117 and propagates through and across the trench 59. While such a lens 99 could be formed in a variety of ways, an etched lens is presently preferred.

It also may desirable for the trench 59 to be inclined relative to the axis along which the waveguides 117, 217 are arranged (not shown). Preferably the trench 59 is inclined relative to that axis at an angle ranging from approximately 4° to 8°, and more preferably, from approximately 5° and 7°, and most preferably, approximately 6°. This geometry prevents light reflecting off the phase shift element 53 from being directed back into waveguide 117.

Figure 13:
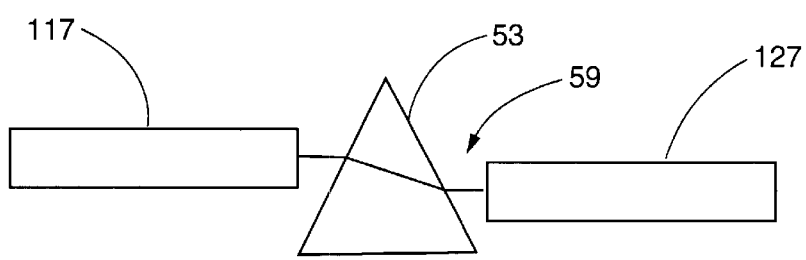
FIG. 13 is a schematic view showing offset waveguides arranged about a phase shift element.

A tapered phase shift element 53 may cause the optical signal to be offset from its initial optical path, i.e., defined as the optical signal exits waveguide 117, due to prismatic effects of the tapered phase shift element 53. As depicted in FIG. 13, waveguide 217 may be positioned with respect to waveguide 117 to accommodate that offset in the optical path.

Turning again to FIG. 2, actuator 55 can be driven to selectively vary the position of variable phase shift element 53, 153, 253 in trench 59. Depending upon the position and shape of the phase shift element 53, 153, 253, and the inherent biasing phase shift due to the asymmetric legs 15, 17 of MZI 13, a phase shift ranging from approximately 0° to approximately 180° (π) may be introduced into an optical signal propagating in and through the MZI 13. The phase shifted optical signal propagating through second arm 17 thereafter combines with the non-phase shifted optical signal propagating through first arm 15 at waveguide 49', subject, as noted, to the biasing phase shift. Depending on the combined phase shift in the optical signal propagating in and through each arm 15, 17, the optical signal output from the MZI 13 via output 31 will vary in amplitude from approximately 0 (for a 180° phase shift) to approximately 100% (for a 0° phase shift) of the amplitude of the signal entering the device at input 27. For example, when a combined 0° phase shift is applied, i.e., when the phase shift element 53 is not positioned in the optical path, the two optical signals combined in waveguide 49' will constructively interfere with each other to provide an output signal approximately equal (in phase and amplitude, for example), to the input signal. On the other hand, if a combined 180° phase shift is applied, the two optical signals combined in waveguide 49' will destructively interfere with each other to provide no output signal. It will be obvious to persons skilled in the art and from the disclosure provided herein that combined phase shifts between 0° and 180° will similarly effect the phase and magnitude of the output of the MZI 13 thereby providing an analog output from the MZI 13.

As shown in FIGS. 2, 3 and 5A, the phase shift element 53 is affixed to actuator 55 by link 57 and is arranged to move reciprocally without interference in and along trench 59. In an embodiment of the present invention, and as depicted in FIG. 2, the phase shift element 53 may be selectively moved into and out of the optical path along a line generally parallel with a surface 159 defined in the trench 59. Link 57 is preferably made from a light-weight, stiff material. The actuator 55 thus enables selective movement of the phase shift element 53 into and out of the optical path defined through the trench 59 by the waveguides 117, 217, and selective positioning of the phase shift element 53 to any of a plurality of positions within the optical path. A phase shift ranging from 0° to 180° may thus be introduced in an optical signal passing through the phase shift element 53 depending upon the position of the element 53.

Figure 7:
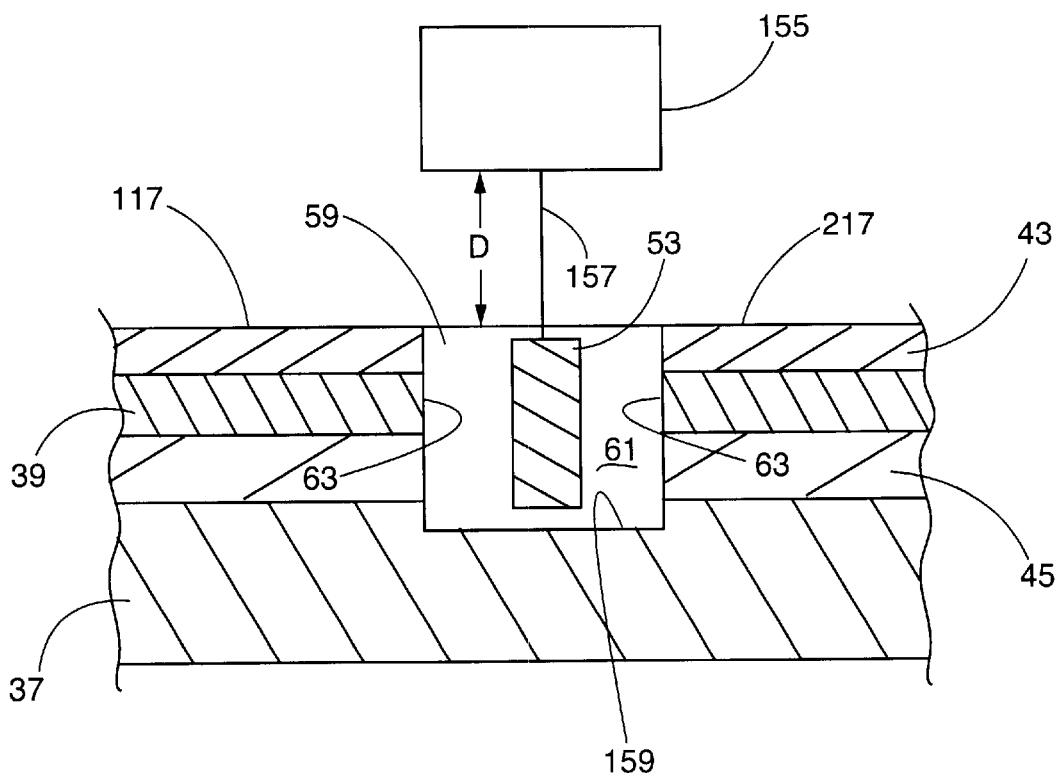
FIG. 7 is a cross-sectional view showing an alternate configuration to that shown in FIG. 5B.

It should be understood that the direction of movement of the phase shift element 53 is not limited to movement in and along the trench 59. Phase shift element 53 may be moved in any direction which guides it into and out of the optical path, or which provided selective positioning within the optical path. With reference to FIG. 7, phase shift element 53 is connected to actuator 155 by link 157. Phase shift element 53 can be reciprocated by the actuator 155 into and out of the optical path, as indicated by arrow D, along a line generally intersecting the surface 159, or similarly, along a diagonal line intersecting the surface 159.

Actuator 55 serves to move the phase shift element 53, 153, 253, 353 into and out of the optical path. While any suitable actuator could be used to implement this invention, it is presently thought that either an electrothermal or electromechanical type actuator would be preferred.

Electrothermal actuators are in general known in the art, and therefore will not be described in precise detail. For the purposes of this invention, it will be appreciated that any electrothermal actuator could be used which sufficiently changes its size in response to the application of energy.

One benefit to using electrothermal actuators is that such actuators may be latching-type devices maintain its position without the continuous application of energy.

Although electrothermal actuators are relatively simple to manufacture and operate, they are relatively slow to act, and introduce heat to the system. Thus, other actuators may be used instead.

Electrostatic actuators could be used to move the phase shift element. Benefits of electrostatic actuators include high operating speed, low energy consumption, and minimal system heating.

Another aspect of the present invention compensates for optical return loss (ORL) caused when an optical signal passes between materials having different refractive indices, which may occur here where the optical signal passes from waveguide 117, across trench 59, through phase shift element 53, and into waveguide 217. The difference in refractive indices of those materials, particularly between the core 39 of waveguides 117, 217, the medium 61 provided in trench 59, and the phase shift element 53, may cause part of the optical signal (in terms of optical power) to be reflected by the phase shift element 53 and propagate back into the waveguide 117 and along the optical path, for example. That reflected signal can disadvantageously reflect back to and possibly destabilize the optical signal source.

Figure 14:
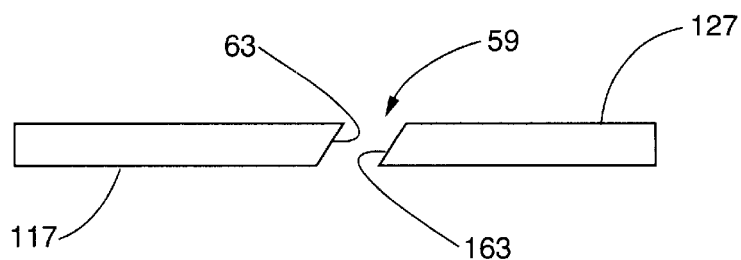
FIG. 14 is a schematic view showing waveguides with angled facets.

With reference now to FIG. 14, by suitably angling the ends 63, 163 which border trench 59, any reflected signal is directed away from the waveguide core 39 and toward the cladding 43 or 45 (see, e.g., FIG. 4), thereby preventing the reflected light from interfering with the optical signal being guided by and propagating in the waveguides 117, 217'. In an embodiment of the present invention, the ends 63, 163 could be disposed at an angle ranging from about 6° to 10°, and more preferably, about 8°, to minimize the loss due to a reflected optical signal. It is preferable to keep the ends 63, 163 substantially vertical relative to the substrate 37, and to bevel the ends 63, 163 along a plane perpendicular to the plane of the substrate 37. A further benefit to this arrangement is the destruction of the Fabry-Perot cavity which would be formed were the ends 63, 163 perpendicular to one another.

In another aspect of the present invention, optical return loss may be further minimized by applying an antireflective coating (not shown) to at least one of the waveguide ends 63, 163.

The MZI 13 of the present invention, and an optical switch 7 formed therefrom, may be monolithically formed or assembled using a flip-chip manufacturing technique, the latter being generally depicted in FIGS. 15A and 15B. In flip-chip manufacturing, the waveguides 49, 49' and trench 59 are monolithically formed on a first chip 200 using known semiconductor fabrication techniques and processes (e.g., deposition, etching, etc.). The phase shift element 53, actuator 55 and spacers 75 are formed on a second chip 210. Prior to assembly, the two chips 200, 210 are oriented to face each other, and aligned so that corresponding parts (e.g., phase shift element 53 and trench 59) of the chips oppose one another. Spacers 75 regulate the distance between chips 200, 210 as they are joined, and keep the chips from being pressed too close together. The spacers 75 may also be used to insure that the chips 200, 210 are joined in proper registration with each other. The chips are then joined in known fashion.

Alternatively, in another embodiment of the present invention, the MZI 13 of the resent invention, and switches 7 constructed therefrom, may be constructed by monolithically forming the various parts (e.g., waveguides, phase shifter (phase shift element, link and actuator)). In such an embodiment, the various parts of the MZI 13 and switch 7 are formed on a single substrate 37 through the selective deposition and removal of different layers of material using now known or hereafter developed semiconductor etching techniques and processes. One of the benefits of monolithic fabrication is that it avoids the need to register the different components before the two substrates are joined.

Referring to FIGS. 16A and 16B, both a flip-chip and monolithically formed optical switches 7 in accordance with the present invention are there respectively depicted. Both figures depict connection of the optical switch 7 to external optical components such as, for example, optical fibers 67, such that waveguide cores 39 optically align with fiber cores 65. Each optical fiber 67 is supported by a grooved member 69, and secured in place using a fiber lid 71. A glass cover 73 protects the underlying components. Alternative ways of securing the optical fibers, or of using other light pathways, also could be used.

One difference between the two fabrication techniques is the location of the phase shifter 51: above the waveguides for flip-chip and within the substrate 39 for monolithic.

The above-described semiconductor materials and relative refractive indices are illustrative, non-limiting examples of embodiments of the waveguide structure of the present invention.

Thus, while there have been shown and described and pointed out novel features of the present invention as applied to preferred embodiments thereof, it will be understood that various omissions and substitutions and changes in the form and details of the disclosed invention may be made by those skilled in the art without departing from the spirit of the invention. It is the intention, therefore, to be limited only as indicated by the scope of the claims appended hereto.

It is also to be understood that the following claims are intended to cover all of the generic and specific features of the invention herein described and all statements of the scope of the invention which, as a matter of language, might be said to fall therebetween.

What is claimed is:

1. A Mach-Zehnder interferometer comprising:
    a continuous arm defining a first optical path having a length;
    a non-continuous arm having a first part and a second part with a trench defined therebetween, the non-continuous arm defining a second optical path having a length different from the length of the first optical path; and
    a phase shifter selectively movable between a first position, in which the phase shifter introduces no phase shift to an optical signal traveling along the second optical path, and at least a second position at which the phase shifter introduces a phase shift to the optical signal traveling along the second optical path, relative to an optical signal propagating through the first optical path.

2. A Mach-Zehnder interferometer according to claim 1, wherein the first and second optical paths are dimensioned to introduce a relative shift ranging from approximately 0° to approximately 180° into the optical signal passing through the second optical path relative to the optical signal propagating through the first optical path.

3. A Mach-Zehnder interferometer according to claim 1, wherein the phase shifter is dimensioned to introduce a phase shift ranging from approximately 0° to approximately 180° into the optical signal when the phase shifter is in the second optical path.

4. A Mach-Zehnder interferometer according to claim 1, wherein the optical phase shifter comprises:

a phase shift element; and
an actuator coupled to the phase shift element for causing selective movement of the phase shift element between the first position in which the phase shift element is out of the second optical path, and the second position in which the phase shift element is in the second optical path so as to introduce the phase shift in an optical signal propagating along the second optical path.

5. A Mach-Zehnder interferometer according to claim 4, wherein the phase shift element is sized and shaped to introduce a phase shift ranging from approximately 0° to approximately 180° into the optical signal when the phase shift element is in the second optical path.

6. A Mach-Zehnder interferometer according to claim 5, wherein the phase shift element is a wedge-shaped prism.

7. A Mach-Zehnder interferometer according to claim 5, wherein the phase shift element has a stepped profile.

8. A Mach-Zehnder interferometer according to claim 7, wherein the phase shift element has a single-sided stepped profile.

9. A Mach-Zehnder interferometer according to claim 1, wherein the phase shift element is a rectangular prism.

10. A Mach-Zehnder interferometer according to claim 1, wherein the phase shift element introduces a fixed phase shift into the optical signal.

11. A Mach-Zehnder interferometer according to claim 10, wherein the fixed phase shift is a substantially $\pi$ phase shift.

12. A Mach-Zehnder interferometer according to claim 1, wherein the first part and the second part of the non-continuous arm are separated by the trench and a distance of not more than approximately 40 $\mu$m.

13. A Mach-Zehnder interferometer according to claim 1, wherein the trench has a substantially constant depth.

14. A Mach-Zehnder interferometer according to claim 1, wherein the trench has a variable depth.

15. A Mach-Zehnder interferometer according to claim 1, wherein a surface is defined in the trench and wherein the phase shifter is selectively movable into and out of the second optical path along a line generally parallel with the surface.

16. A Mach-Zehnder interferometer according to claim 1, wherein a surface is defined in the trench and wherein the phase shifter is selectively movable into and out of the second optical path along a line generally intersecting the surface.

17. A Mach-Zehnder interferometer according to claim 1, wherein the non-continuous arm has an index of refraction and wherein the phase shifter has an index of refraction different from the non-continuous arm index refraction.

18. A M×M optical switch for receiving an optical signal from an optical source and for switching the optical signal to one of M outputs of the switch, the switch comprising:
    a Mach-Zehnder interferometer comprising:
        a continuous arm defining a first optical path having a length;
        a non-continuous arm having a first part and a second part with a trench defined therebetween, the non-continuous arm defining a second optical path having a length different from the length of the first optical path; and
        a phase shifter selectively movable between a first position, in which the phase shifter introduces no phase shift to an optical signal traveling along the second optical path, and at least a second position at which the phase shifter introduces a phase shift to the optical signal traveling along the second optical path, relative to an optical signal propagating through the first optical path.

19. A M×M optical switch according to claim 18, wherein the first and second optical paths are dimensioned to introduce a relative shift ranging from approximately 0° to approximately 180° into the optical signal passing through the second optical path relative to an optical signal propagating through the first optical path.

20. A M×M optical switch according to claim 18, wherein the phase shifter is dimensioned to introduce a phase shift ranging from approximately 0° to approximately 180° into the optical signal when the phase shifter is in the second optical path.

21. A M×M optical switch according to claim 18, wherein the optical phase shifter comprises:
   a phase shift element; and
   an actuator coupled to the phase shift element for causing selective movement of the phase shift element between the first position in which the phase shift element is out of the second optical path, and the second position in which the phase shift element is in the second optical path so as to introduce the phase shift in an optical signal propagating along the second optical path.

22. A M×M optical switch according to claim 21, wherein the phase shift element is sized and shaped to introduce a phase shift ranging from approximately 0° to approximately 180° into the optical signal when the phase shift element is in the second optical path.

23. A M×M optical switch according to claim 21, wherein the phase shift element is a wedge-shaped prism.

24. A M×M optical switch according to claim 21, wherein the phase shift element has a stepped profile.

25. A M×M optical switch according to claim 24, wherein the phase shift element has a single-sided stepped profile.

26. A M×M switch according to claim 21, wherein the phase shift element is a rectangular prism.

27. A M×M switch according to claim 21, wherein the phase shift element introduces a fixed phase shift into the optical signal.

28. A M×M switch according to claim 27, wherein the fixed phase shift is substantially a π phase shift.

29. A M×M optical switch according to claim 18, wherein the first part and the second part of the non-continuous arm are separated by the trench and a distance of not more than approximately 8–40 μm.

30. A M×M optical switch according to claim 29, wherein the first part and the second part of the non-continuous arm are separated by the trench and a distance of not more than approximately 12–20 μm.

31. A M×M optical switch according to claim 18, wherein the trench has a substantially constant depth.

32. A M×M optical switch according to claim 18, wherein the trench has a variable depth.

33. A M×M optical switch according to claim 18, wherein a surface is defined in the trench and wherein the phase shifter is selectively movable into and out of the optical path along a line generally parallel with the surface.

34. A M×M optical switch according to claim 18, wherein a surface is defined in the trench and wherein the phase shifter is selectively movable into and out of the optical path along a line generally intersecting the surface.

35. A M×M optical switch according to claim 18, wherein the non-continuous arm has an index of refraction and wherein the phase shifter has an index of refraction different from the non-continuous arm index refraction.

* * * * *